United States Patent [19]

Schmidt et al.

[11] 4,257,728

[45] Mar. 24, 1981

[54] GARBAGE DISPOSAL VEHICLE WITH BOX BEAM SUPPORTED TANK

[75] Inventors: Herbert Schmidt, Friedberg; Erwin Kurz, Augsburg; Rudolf Berger, Friedberg; Erich Pilz, Gersthofen, all of Fed. Rep. of Germany

[73] Assignee: Industrie-Werke Karlsruhe Augsburg Aktiengesellschaft, Fed. Rep. of Germany

[21] Appl. No.: 17,028

[22] Filed: Mar. 2, 1979

[30] Foreign Application Priority Data

Mar. 3, 1978 [DE] Fed. Rep. of Germany ....... 2809191

[51] Int. Cl.³ .................................... B60P 1/40

[52] U.S. Cl. .................................... 414/468; 414/526

[58] Field of Search ...................... 414/468, 526, 149; 366/63

[56] References Cited

U.S. PATENT DOCUMENTS

| | | | |
|---|---|---|---|
| 2,825,478 | 3/1958 | Hunnicutt et al. | 414/468 |
| 3,104,022 | 9/1963 | Schaffler et al. | 414/468 |

*Primary Examiner*—Robert G. Sheridan

*Attorney, Agent, or Firm*—McGlew and Tuttle

[57] ABSTRACT

A rotary drum storage tank for receiving and conveying garbage includes a rear cover for the tank with a helical baffle protruding into the storage tank and which acts as a pressing screw which pushes the material which is dumped into the tank backwardly into the rear thereof. The baffle acts in conjunction with a plurality of strikers arranged on the inner wall of the rotary drum storage tank and which rotate with the tank to force the material into the storage space. The drum is mounted on annular ball bearings which are secured on a bolt which is mounted on a box girder or closed frame girder having a central opening therethrough which accommodates the bearings. The construction is such that the driving motor is mounted on the box girder and guides the drum through an annular gear defined on its exterior surface as well as all of the other bearing forces including the pressing forces of the baffle which act as a pressing screw as well as the forces originating from the weight of the cover and for operating the cover and for locking it are all coupled positively to the box girder. Preferably, an independent motor is flanged to the box girder.

5 Claims, 4 Drawing Figures

GARBAGE DISPOSAL VEHICLE WITH BOX BEAM SUPPORTED TANK

FIELD AND BACKGROUND OF THE INVENTION

This invention relates to the construction of vehicles having garbage loading and storage facilities in general and, in particular, to a new and useful construction for mounting a rotary storage tank, particularly for garbage, on the chassis of a vehicle which includes a box girder or beam which is mounted on a supporting frame and which provides means for mounting the drive for the rotary drum as well as for absorbing all of the operating forces thereon which are effective to advance the garbage into the interior of the drum.

DESCRIPTION OF THE PRIOR ART

The present invention relates in particular to a rotary drum storage tank for receiving and conveying garbage or other loose material wherein the rear cover plate is provided with a helical baffle protruding into the storage tank which pushes the material, in connection with strikers arranged in the inner wall of the rotary drum and revolving with the latter (clearing screw), into the storage tank and forces it, as a pressing screw, into the storage tank and, wherein, the tank rotates in a box beam or girder which bears on a mounting frame connected with a traveling gear. Such a rotary storage tank of the above type is known from German Pat. No. 1,144,185 and it comprises with reference to FIG. 1, a rotary drum 1 whose rear end is terminated by a cover plate 2. This cover, which can be turned relative to the chassis of a vehicle transporting the rotary storage tank, carries a truncated hollow cone 5 which protrudes into the interior of the rotary drum. With a helical baffle 6 secured on the outer side thereof which extends from the upper apex S on the cover plate over about 180° up to a point E on the inner frustum plane, and thus has a slope which extends in the above-mentioned angular range over the entire depth of frustum 5.

The baffle 6 is extended in a radial direction by another 90°, but only in the form of a circular segment without slope. This circular segment serves to prevent the loose material, led out of a charging space by the screw conveyor effect of baffle 6 in cooperation with striker fins extending axially on the interior of the rotary drum and which is pushed away into the interior of the rotary drum, from dropping back into this charging space.

The said action of the circular segment arranged in the extension of the baffle is also of importance in view of the compression of the loose material in the interior of the rotary drum. After the loose material has been prevented from dropping back to the charging opening and, in addition, new loose material is constantly supplied over the baffles acting in this respect as cleaning screws, the circular segment acts as a pressing screw to compress the loose material in the interior of the rotary drum.

In the known rotary storage tanks for receiving and conveying garbage and other loose material, tank 1 is set into rotation and kept rotating by a drive including a gear rim 8 welded on the circumference and an auxiliary drive 9, shown in broken lines in the drawing of the prior art, derived from the vehicle drive. The driving units themselves are mounted in a so-called mounting or auxiliary frame 10 which carries the effective body proper, that is, tank 1, and which can be lifted for repair and maintenance from the chassis 3 of the vehicle. On the basis of this mounting frame concept, the same chassis can thus be equipped with different effective bodies.

In known garbage trucks with rotary drums, the driving units for the rotary tank are thus mounted in the mounting frame, as mentioned above, while this rotary tank bears, on the other hand, on a large ball bearing 11, as shown in FIG. 1, which in turn bears on a bearing block 12, rigidly connected with the chassis. Forces thus appear during the rotation of the tank which act on both the mounting frame and on the chassis in such a way that resulting force-components are produced which can lead to damages of the chassis and/or of the mounting frame.

In addition, there are the forces originating from support 14 of the cover plate, its opening cylinder bearing 15 and cover locking bearing 13. The elements 13, 14 and 15 (FIG. 1) are secured, independent of each other, over arms on the outer race of the large ball bearing in segment-form. This leads to torsions on the large ball bearing and is thus responsible for a relatively heavy construction of this bearing.

These forces, and the torsions of the chassis, e.g., on uneven terrain, cause constant deviations between the axis of the rotary tank and the axis of the driving unit. These result in bending stresses which can lead to fatigue damages of the material in some cases. Beyond that, axle deviations result in a reduction of the efficiency of the rotary tank drive.

SUMMARY OF THE INVENTION

The present invention provides a rotary storage tank where the inconveniences of the prior art are eliminated. In accordance with the invention, the driving forces for the pressing forces originating from the baffle acting as a pressing screw, as well as the forces originating from the weight of the cover plate and of the elements operating and locking it, are positively coupled in the box girder or beam. The force-feeding points originating from the cover support, as well as from the support of the opening cylinders and of the locking mechanism, are no longer conducted in segment form, but rather, according to the present invention, in ring form over the box girder to the large ball bearing.

Accordingly, an object of the present invention is to provide, in a mounting on a vehicle chassis for a rotary drum storage tank for receiving and conveying garbage and other loose material, a rear cover for the tank with a helical baffle protruding into the storage tank which acts as a pressing screw which pushes the material away into the storage tank and which cooperates with a plurality of strikers arranged in the inner wall of the rotary storage tank and which rotate with the tank to force the material into the storage tank and which further includes a mounting frame for mounting the storage tank on a vehicle, the further improvement, comprising, a box girder bearing on the mounting frame with drive means mounted on the box girder and engaged with the drum storage tank to rotate it and thereby produce driving forces, as well as cover operating means which are connected to the cover and operate it as well as lock it, all mounted on the box girder so that the driving forces for the rotary movement of the tank, the bearing forces of the tank and the pressing forces originating from the baffle acting as a pressing screw, as well as the forces originating from the weight of the cover and the cover-operating means, are coupled positively in the box girder.

A further object of the invention is to provide a rotary storage tank with interchangeable body which is simple in design, rugged in construction and economical to manufacture.

The various features of novelty which characterize the invention are pointed out with particularity in the claims annexed to and forming a part of this disclosure. For a better understanding of the invention its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
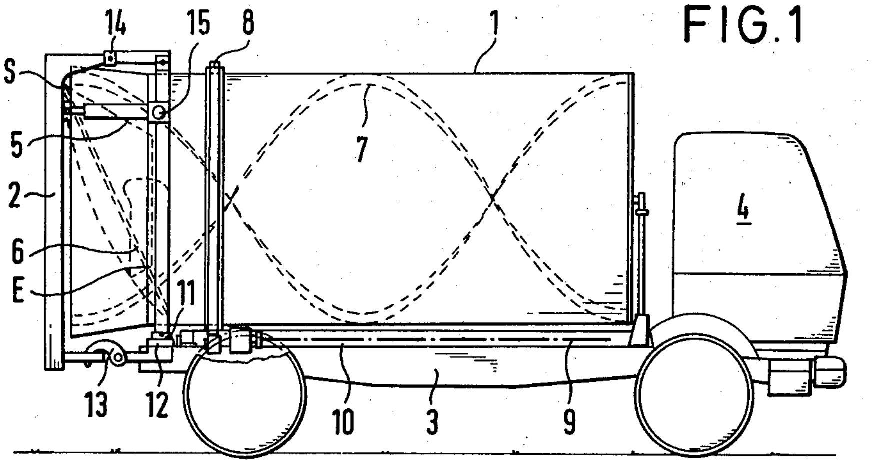
(PRIOR ART) FIG. 1
FIG. 1 is a side elevational view of a garbage truck constructed in accordance with the Prior Art.
Figure 4:
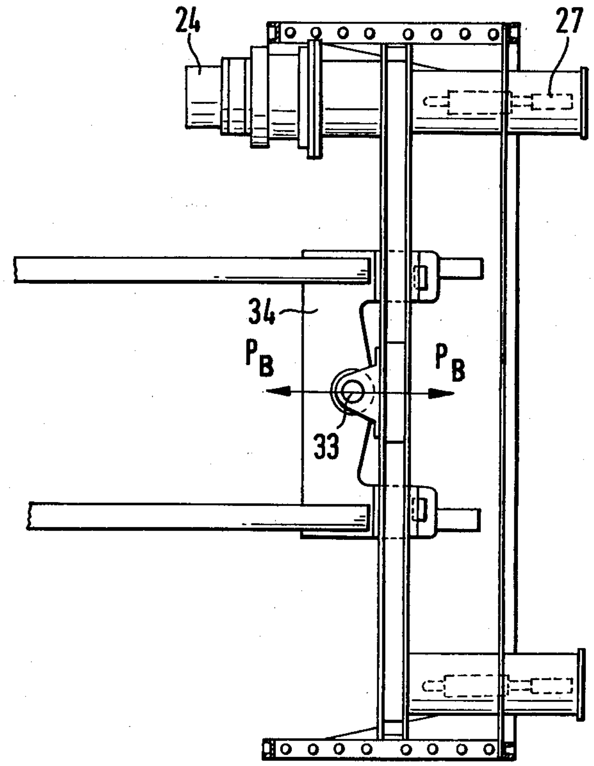
FIG. 4 is a top plan view showing how the box beam is supported on the auxiliary frame.
Figure 2:
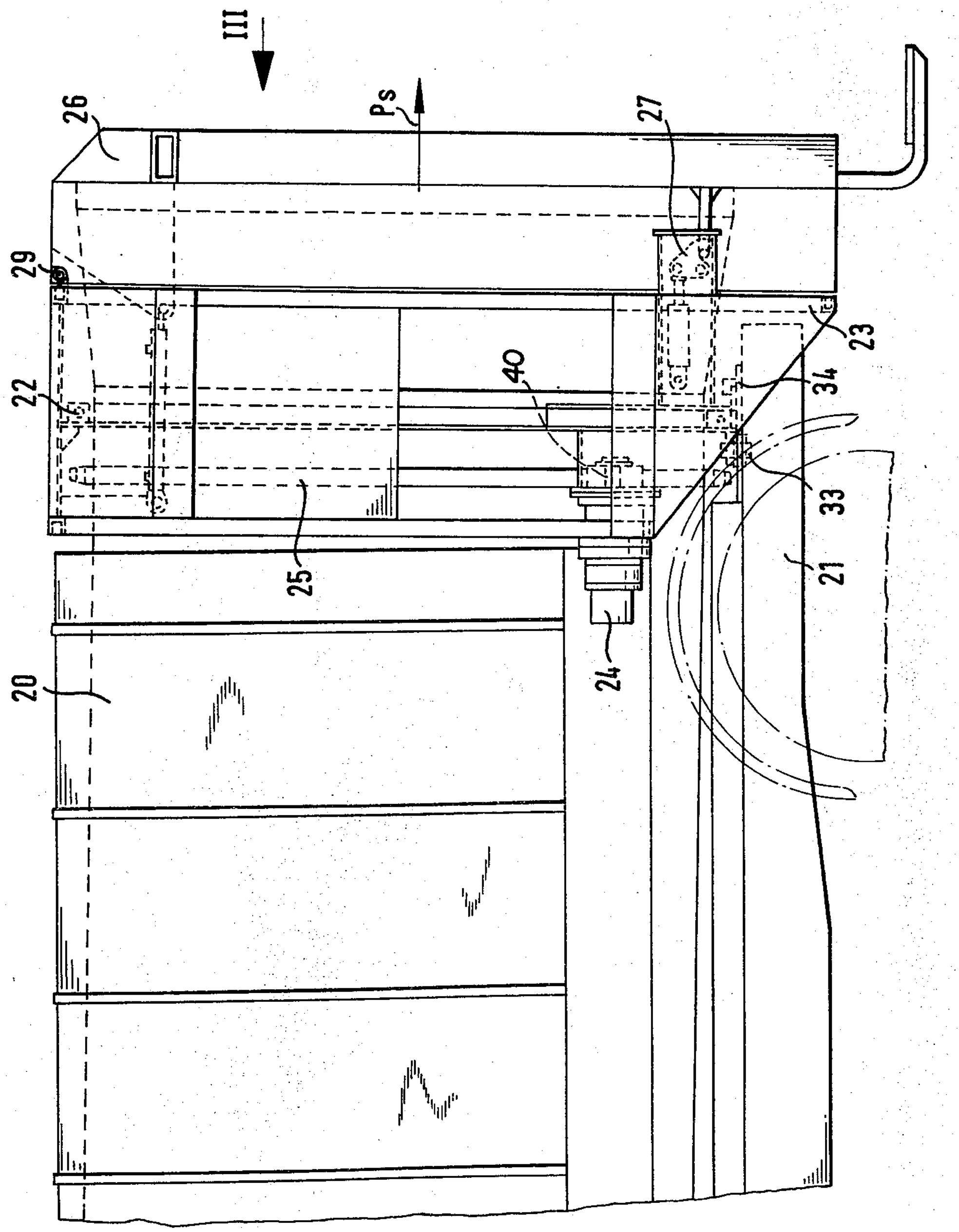
FIG. 2 is an enlarged partial elevational view of a garbage truck constructed in accordance with the present invention.
Figure 3:
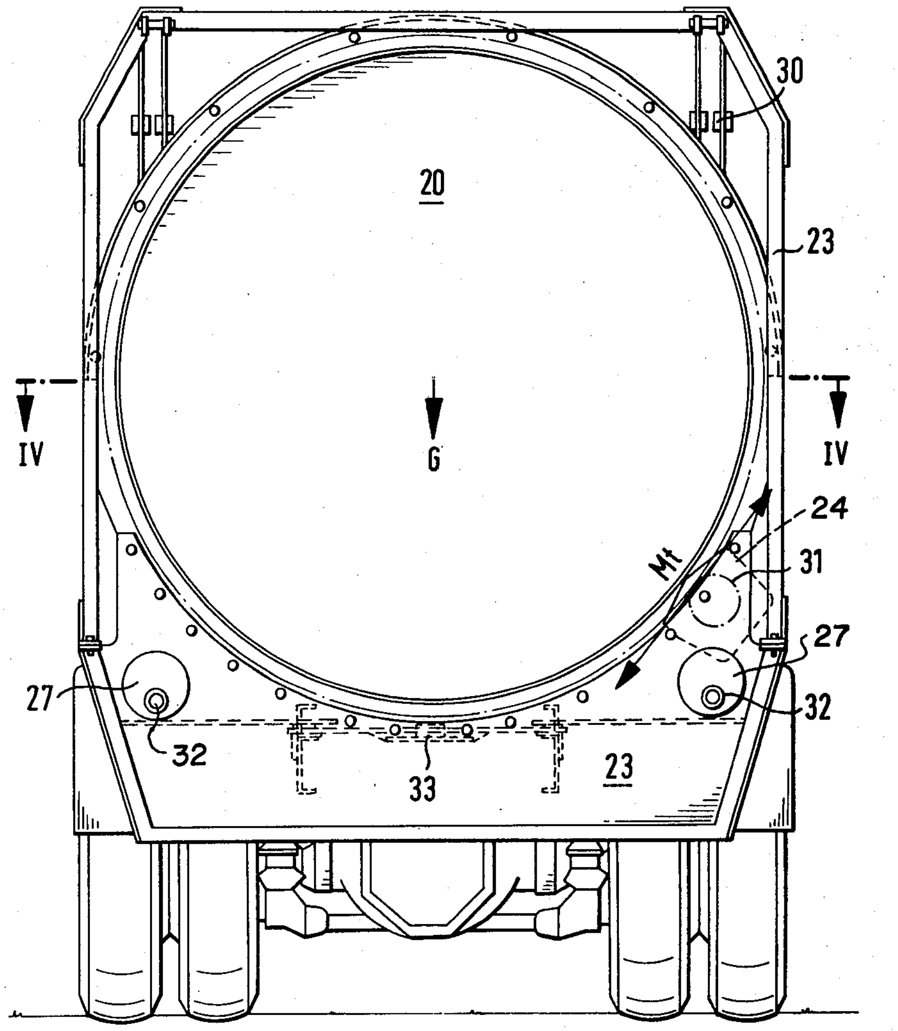
FIG. 3 is a rear elevational view of the truck shown in FIG. 2 with the cover omitted, taken in the direction of the arrow III.

Referring to the drawings in particular, the invention embodied therein, as indicated in FIGS. 2, 3 and 4, comprises, a garbage truck having all of the elements indicated in FIG. 1 of the prior art, with the exception of the manner of mounting the rotary drum on a frame which is supported on the truck or vehicle chassis which comprises, in accordance with the invention, a box beam, generally designated 23, which is of a frame-like construction and which includes a central opening which rotatably supports a bearing for rotatably supporting a rotary storage tank or rotary drum 20.

The rotary storage tank comprises a tank or drum 20 receiving the material to be collected and conveyed and which is mounted on a vehicle chassis 21. The tank 20 is mounted on a large annular ball bearing 22 in the closed, two-part box beam or girder 23.

Box girder 23 includes an upper and a lower part, which are jointed with each other. The lower part of box girder 23 bears directly on a plate 34 of a mounting frame which is firmly secured to the chassis 21 for horizontal rotation about a bolt 33. The bearing forces of the tank 20 are directly introduced into the chassis and the beam can execute horizontal pivotal movement about the pin 33.

According to the invention, the above-mentioned driving and pressing forces are likewise introduced into the box girder 23. The driving forces are applied by driving means 24 which is connected or flanged directly a longitudinal extension of the bottom part of box girder 23 including a separate driving motor 24 having a shaft with a drive pinion 31 engaged with a gear rim 25 welded on the circumference of tank 20. The pressing forces, which originate from the baffle 6 (See FIG. 1), arranged on cover plate 26, are transmitted to the box girder through complementary locking means 27, with one component thereof being rigidly connected with the bottom part of box girder 23. With regard to the drive for the gear rim, it is also conceivable and within the framework of the invention to drive it through a flexible coupling from an auxiliary drive of the vehicle drive.

The cover plate bearing, realized by a joint 29 (FIG. 2), as well as the bearing for the cylinders 30 (FIG. 3) serving to open cover plate 26, are connected to the top part of box girder 23. FIG. 3 shows the elements acting in box girder 23, as well as the forces originating from them on a larger scale.

Tank 20 which is driven by the pinion 31 mounted on the bottom part of the box girder, transmits the torque Mt over the garbage to the baffle 6 (FIG. 1), which is rigidly connected with cover 26. Cover 26, in turn, transmits the moment to the centerings pins 32 of box girder 23 connected with the locking means 27 so that the moments cancel each other out and are not transmitted to the chassis. The intrinsic weight of the superstructure and of the useful load are indicated vectorially by the arrow G.

FIG. 4 shows the forces $P_B$ on the system during acceleration and decleration, which originate from the intrinsic weight and from the useful load of the vehicle, and which are transmitted over the mounting frame to the chassis. The point of derivation of the forces corresponds to bolt or pin 33, which represents the connection between box girder 23 and mounting plate 34.

The concept of box girder 23, according to the invention, provides substantially better conditions regarding the force components, so that the large ball bearing can be made of a lighter conslruction. Compared to the known garbage truck with a rotary drum, a reduction of the weight of the entire body can be achieved due to the better ratio of the forces. Because of the positive coupling of box girder and drive, no torsional forces are transmitted for the drive of the drum from the body to the mounting frame and the chassis, which could lead to ruptures. While a specific embodiment of the invention has been shown and described in detail to illustrate the application of the principles of the invention, it will be understood that the invention may be embodied otherwise without departing from such principles.

What is claimed is:

1. In a garbage disposal vehicle having a chassis, a storage tank rotatably mounted on the chassis with a rear opening end, a cover for covering the rear opening end including a helical guide baffle which is effective in moving and compacting garbage into the tank during rotation of the tank, a large-size ball bearing having an inner race engaged around the tank in the vicinity of the rear open end and an outer race for supporting the tank for rotation, and a rim gear connected around the tank in the vicinity of the rear open end thereof with drive means engaging the rim gear to rotate the tank, the improvement comprising an auxiliary frame plate connected to the chassis, a box beam having side top and bottom portions extending around the tank supported on said auxiliary frame, a substantially horizontal pin connected between said box beam and auxiliary frame for permitting horizontal movement between said auxiliary frame and box beam, the outer race of the large-size ball bearing being connected to respective opposite side portions of said box beam, said box beam extending around the outer race, at least one hinge connected to said top portion of said box beam and to the cover for pivotally mounting the cover to close the rear opening end of the tank, at least one power cylinder connected between said top portion of said box beam and the cover for moving the cover, a locking mechanism connected to said box beam and engageable with the cover for locking the cover in its covering position over the rear open end of the tank, and a longitudinally extending extension of said box beam connected to the drive means whereby forces applied to said box beam are not transferred to the chassis.

2. A garbage disposal vehicle according to claim 1, wherein said drive means includes a pinion engaged with said rim gear, said pinion and rim gear disposed adjacent said large-size ball bearing around the tank.

3. A garbage disposal vehicle according to claim 2, wherein said substantially horizontal pin is disposed at an axial location along the tank between the rim gear and large size ball bearing.

4. A garbage disposal vehicle according to claim 1, wherein said drive means include a motor connected to a pinion engaged with the rim gear, said motor connected to said extension of said box beam connected at said bottom portion of said box beam and adjacent one of said side portions of said box beam.

5. A garbage disposal vehicle according to claim 4, wherein said locking mechanism comprises a pair of locking members connected to said bottom portion of said box beam adjacent respective side portions thereof and locking pins extending from the cover whereby a torque force applied by said drive means is balanced against said pair of locking members and on said box beam.

* * * * *

UNITED STATES PATENT AND TRADEMARK OFFICE

CERTIFICATE OF CORRECTION

PATENT NO. : 4,257,728

DATED : March 24, 1981

INVENTOR(S) : HERBERT SCHMIDT et al

It is certified that error appears in the above—identified patent and that said Letters Patent is hereby corrected as shown below:

claim 1, line 15, (column 4, line 57 of the patent) change "horizontal" to -- vertical --;

line 17, (column 4, line 59 of the patent), change "movement" to -- rotation --.

Claim 3, line 2, (column 5, line 12), change "horizontal" to -- vertical --.

Signed and Sealed this

*Sixteenth* Day of *February 1982*

[SEAL]

*Attest:*

GERALD J. MOSSINGHOFF

*Attesting Officer* *Commissioner of Patents and Trademarks*